US008868731B1

(12) United States Patent
Tsai et al.

(10) Patent No.: US 8,868,731 B1
(45) Date of Patent: Oct. 21, 2014

(54) TECHNIQUE FOR FALSE POSITIVES PREVENTION IN HIGH AVAILABILITY NETWORK

(75) Inventors: Chia Tsai, Cupertino, CA (US); Minjie Lin, Sunnyvale, CA (US); Yibin Yang, San Jose, CA (US); Debashis Patnala Rao, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 512 days.

(21) Appl. No.: 13/154,275

(22) Filed: Jun. 6, 2011

(51) Int. Cl.
  *G06F 15/173* (2006.01)
  *H04L 12/28* (2006.01)
  *H04L 12/56* (2006.01)
  *G06F 11/00* (2006.01)

(52) U.S. Cl.
  USPC ........... 709/224; 709/238; 370/390; 370/419; 370/401; 726/25; 714/43

(58) Field of Classification Search
  USPC .................. 709/224, 238; 370/390, 419, 401; 726/25; 714/43
  See application file for complete search history.

(56) References Cited

U.S. PATENT DOCUMENTS

| 7,543,190 | B2 | 6/2009 | Walker | |
|---|---|---|---|---|
| 2006/0236402 | A1* | 10/2006 | Russell et al. | 726/25 |
| 2007/0180105 | A1 | 8/2007 | Filsfils et al. | |
| 2007/0207591 | A1 | 9/2007 | Rahman et al. | |
| 2009/0010171 | A1 | 1/2009 | Gupta et al. | |
| 2010/0149969 | A1 | 6/2010 | Rahman et al. | |
| 2010/0287305 | A1* | 11/2010 | Kompella | 709/238 |
| 2010/0290464 | A1* | 11/2010 | Assarpour | 370/390 |
| 2011/0085568 | A1* | 4/2011 | Gnanasekaran et al. | 370/419 |
| 2011/0261827 | A1* | 10/2011 | Armstrong et al. | 370/401 |

OTHER PUBLICATIONS

Rost, S.; Balakrishnan, H., "Memento: A Health Monitoring System for Wireless Sensor Networks," Sensor and Ad Hoc Communications and Networks, 2006. SECON '06. 2006 3rd Annual IEEE Communications Society on , vol. 2, no., pp. 575,584, Sep. 28, 2006.*
Dabbagh, M.; Ghandour, A.J.; Fawaz, K.; Hajj, W.E.; Hajj, H., "Slow port scanning detection," Information Assurance and Security (IAS), 2011 7th International Conference on , vol., no., pp. 228,233, Dec. 5-8, 2011.*
Foschiano, M., "Cisco Systems UniDirectional Link Detection (UDLD) Protocol," RFC: 5171, Apr. 2008, pp. 1-13.
Katz, D., et al., "Bidirectional Forwarding Detection (BFD)," RFC: 5880, Jun. 2010, pp. 1-49.
"Cisco IOS Software Configuration Guide," Release 12.2(33)SXH, Cisco Systems, Inc., 2009, pp. i to xxxviii, and 10-1 to 10-8.

* cited by examiner

*Primary Examiner* — Taylor Elfervig
(74) *Attorney, Agent, or Firm* — Novak Druce Connolly Bove + Quigg LLP

(57) ABSTRACT

In one embodiment, a protocol state associated with a port of a network device is determined to have expired. A port group of which the port is a member is determined, the port group including ports that share one or more common characteristics. A policy is applied to the ports of the port group to determine whether one or more other ports in the port group also have a corresponding protocol state protocol that has expired. In response to one or more other ports in the port group also having a corresponding protocol state that has expired, expiration of the protocol state is determined to be a false positive and no further action is taken based on expiration of the protocol state. When expiration of the protocol state is not determined to be a false positive, further action is taken based on expiration of the protocol state.

19 Claims, 7 Drawing Sheets

TECHNIQUE FOR FALSE POSITIVES PREVENTION IN HIGH AVAILABILITY NETWORK

TECHNICAL FIELD

The present disclosure relates generally to computer networks, and, more particularly, to more accurate detection of network problems in computer networks.

BACKGROUND

To meet reliability requirements, network devices often utilize hardware and software-based mechanisms to quickly detect, and in some cases attempt to recover from, link failures. Hardware-based mechanisms typically involve physical signaling and media level fault detection. Software-based mechanisms typically take the form of link monitoring protocols, and may utilize exchanges of protocol packets (e.g., keepalives) over links between neighboring network devices to determine the operational status of links. If one or more protocol packets for a link are not received at a network device during a protocol timeout period, a protocol state of a port coupled to the link may expire, and it may be assumed the link has failed. Common link monitoring protocols that operate in this manner include UniDirectional Link Detection (UDLD) protocol, Bidirectional Forwarding Detection protocol (BFD), Device Link Detection Protocol (DLDP) protocol, among others.

One issue with link monitoring protocols, as well as other types of protocols, is that transient software, hardware or network conditions may lead to "false positive" identifications of network problems, such as, link failures. For example, due to high processor (e.g., CPU) load at a network device, or temporary traffic congestion in the network, protocol packets may be delayed, or otherwise not be received, during a protocol timeout period, and a link may be mistakenly declared as failed, while the link itself is operating normally. False positives may be particularly prevalent with protocols that implement sub-second length timeout periods, as there is a greater likelihood a transient condition may cause protocol packets to not be received within the allotted timeout period. As the reliability of computer networks becomes increasingly important, the existence of substantial numbers of false positives has become unacceptable.

BRIEF DESCRIPTION OF THE DRAWINGS

The embodiments described herein may be better understood by referring to the accompanying drawings in which like reference numerals indicate identically or functionally similar elements, of which.

DESCRIPTION OF EXAMPLE EMBODIMENTS

Overview

According to embodiments of the disclosure, a protocol process executing on a network device may determine a protocol state associated with a port of the network device has expired. Expiration of the protocol state typically indicates a network problem associated with the port, such as a link failure of a link associated with the port. A false positive detection module executing on the network device may determine a port group of which the port is a member. The port group may include a plurality of ports of the network device that share one or more common characteristics. The false positive detection module may apply a policy to the plurality of ports of the port group, to determine whether one or more other ports in the port group also have a corresponding protocol state that has expired. In response to one or more other ports in the port group also having a corresponding protocol state that has expired, the false positive detection module may determine expiration of the protocol state is a false positive, and cause the protocol process to not take further action, e.g., not signal a link failure of the link associated with the port. When expiration of the protocol state is not determined to be a false positive, the protocol process may be permitted to take further action, e.g., to signal a link failure of the link associated with the port.

Description

A computer network is a geographically distributed collection of interconnected communication links used to transport data between nodes, such as computers. Many types of computer networks are available, with the types ranging from local area networks (LANs) to wide area networks (WANs). The network devices (e.g., switches, routers, etc) typically communicate by exchanging discrete packets or messages of data according to pre-defined protocols. In this context, a protocol consists of a set of rules defining how the nodes interact with each other.

Figure 1:
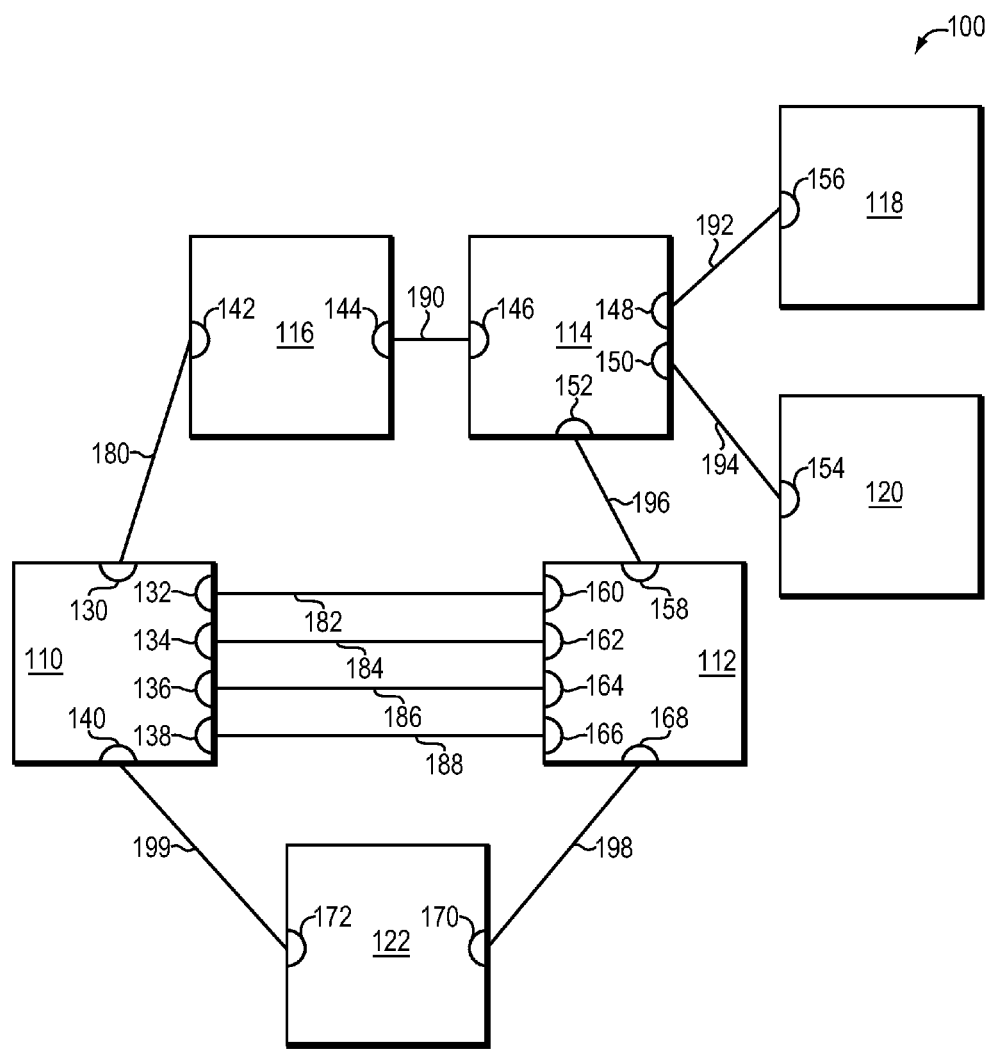
FIG. 1 is a schematic block diagram of an example computer network comprising a plurality of interconnected network devices.

FIG. 1 is a schematic block diagram of an example computer network 100 comprising a plurality of interconnected network devices 110-122. Each network device may include a plurality of "ports". As used herein, the term "port" shall be understood to refer to physical ports, such as physical ports 130-172, which provide a hardware interface to links 180-199, as well logical ports, which define the endpoint of logical connections operating on top of physical links and ports. The links 180-199 (e.g., Ethernet links) may be arranged in any of a variety of manners. In some cases multiple, parallel links may interconnect corresponding pairs of network devices 110-122. For example, links 182, 184, 186, 188 may interconnect network devices 110 and 112. A link aggregation mechanism, such as EtherChannel or IEEE 802.3ad, may be employed to group links into channels (i.e., logical aggregated links) that provides greater bandwidth and/or fault-tolerance than any single constituent individually link can provide.

Figure 2:
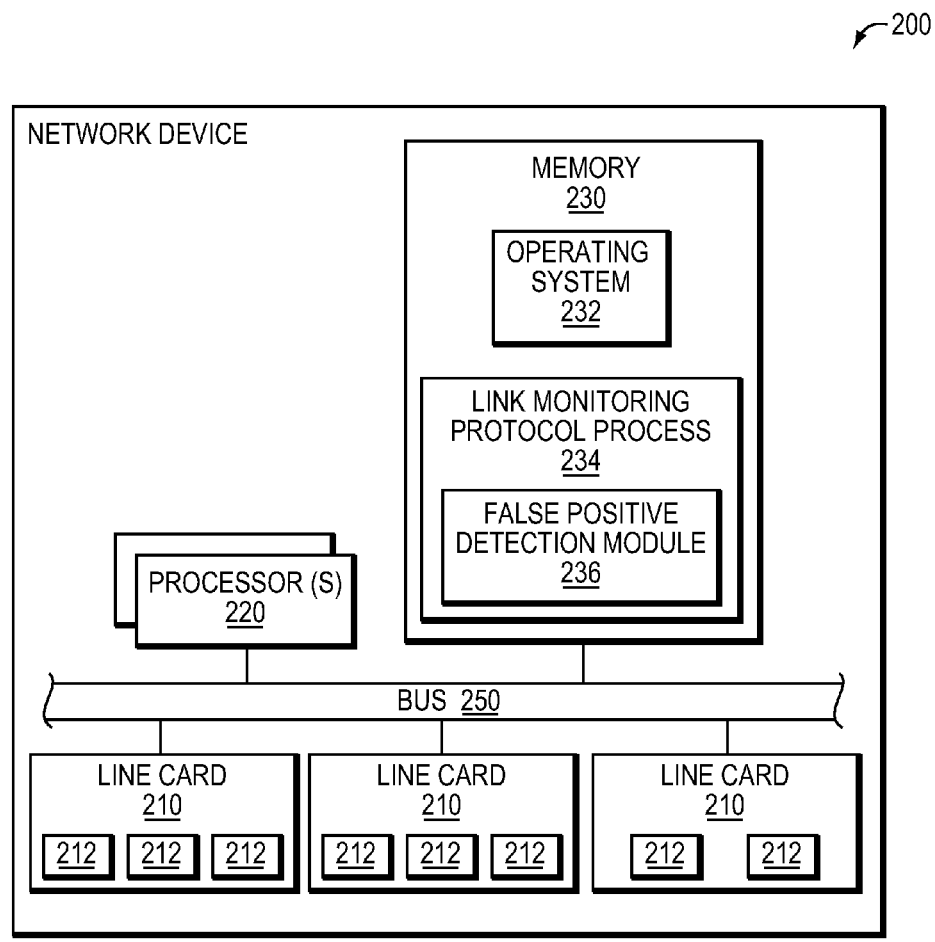
FIG. 2 is a schematic block diagram of an example network device which may be used with the embodiments disclosed herein.

FIG. 2 is a schematic block diagram of an example network device 200 (e.g., a switch) which may be used with the embodiments disclosed herein. The network device 200 may be an example of network devices 110-122, shown in FIG. 1. The network device 200 comprises a plurality of line cards 210, one or more processor(s) (e.g., CPU(s)) 220, and a memory 230, interconnected by a system bus 250. The line cards 210 contain the mechanical, electrical, and signaling circuitry necessary to support one or more physical ports 212 coupled to links of the computer network 100. The memory 230 comprises a plurality of storage locations for storing software and data structures, including software and data structures used to implement at least some of the techniques disclose herein. The processor(s) 220 include logic configured to execute the software and manipulate data from the data structures. While not shown in FIG. 2, at least some of the software and data may be temporarily stored in registers of the processor in conjunction with the processors operation.

An operating system 232, portions of which are resident in memory 230 and executed by the processor(s) 220, functionally organizes the network device 200. A link monitoring protocol process (e.g., a UDLD process, a BFD process, etc.) 234 may interact with the operating system 232 to monitor for network problems. Specifically the link monitoring protocol process 234 may monitor the operational status of physical links coupled to physical ports 212, or links associated with logical ports (not shown). The link monitoring protocol process 234 may monitor the operational status of links (both physical and logical) in a variety of manners. For example, the link monitoring protocol process may be configured to transmit protocol packets (e.g., keepalives) on links at a hello interval based on a hello timer. When the links are operating normally, these protocol packets may be received by neighboring network devices, and echoed back by each neighboring network device, informing the network device 200 that the link is operating normally. The link monitoring protocol process 234 may maintain a protocol state for a port associated with each link, which expires in response to a condition indicative of a link failure. For example, the protocol state may expire if protocol packets for the link are not received at the network device 200 with a certain period of time. The link monitoring protocol process 234 may use a protocol timeout period (e.g., three times a hello interval) in which it checks for proper receipt of protocol packets. If the protocol timeout period ends, and no valid protocol packets have been received for a particular link, the link monitoring protocol process 234 may assume the particular link has failed, and thereby take further action on that port. For example, the port may be transitioned to an undetermined or error disabled state.

As discussed above, in some cases, transient software, hardware or network conditions may lead to "false positive" identifications of network problems, such as link failures. For example, due to high processor load of processor(s) 220, processor failover at a neighboring network device, configuration changes, temporary traffic congestion, or some other transient condition, protocol packets for a link may be delayed, or otherwise not be received, during a protocol timeout period, and a protocol state of a port associated with the link may be caused to expire, while the link itself actually is operating normally. To address this issue, a novel false positive detection module 236 may be employed. The false positive detection module 236 may discriminate between actual network problems, such as link failures, and false positive conditions, to improve the accuracy of detection.

Typically, transient software, hardware or network conditions affect multiple ports that share common characteristics. For instance, if processor(s) 220 are suffering from high load, or if there is some issue with the in band protocol packet path (i.e., the CPU receiving path) of network device 200, all, or at least several, ports of network device 200 may be affected. Similarly, if a neighboring network device is experiencing a transient condition, such as a delay in its packet egress processing due to a processor failover, all, or at least several, ports coupled to links that communicate with that neighboring network device may be affected. In contrast, actual network problems, such as link failures, generally happen at random times, and typically only affect one port/link at a time. There is often little correlation between one actual problem and another actual problem. As explained below, the false positive detection module 236 may implement algorithms that leverage these, and other properties, that may distinguish actual network problems, such as link failures, from likely false positives, to improve the accuracy of detection.

In one embodiment, a false positive detection module 236 executing on the network device 200 may organize the ports of the network device into a plurality of port groups that share one or more common characteristics. These port groups may be organized into a hierarchy having a number of levels. When a protocol state associated with a port expires (e.g., no valid protocol packet has been received for a link associated with the port during a protocol timeout period), the false positive detection module 236 may successively look to any port groups of which the port is a member, starting at a lowest-level port group and proceeding to a highest-level port group. At each level, the false positive detection module 236 may apply a policy to the plurality of ports of the port group, to determine whether one or more other ports in the port group also have a corresponding protocol state that has expired. If one or more other ports in the port group also have a corresponding protocol state that has expired, the false positive detection module 236 may determine expiration of the protocol state is a false positive, and cause the link monitoring protocol process 234 to not take further action, such as not signal a link failure by, for example, not transitioning the port to an undetermined or error disabled state. If all the levels of the hierarchy are examined, and no policy indicates the expiration of the protocol state is a false positive, the false positive detection module 236 may determine expiration of the protocol state indicates an actual network problem, such as a link failure, and permit the link monitoring process 234 to take further action, such as signal the failure by, for example, transitioning the port to an undetermined or error disabled state.

The false positive detection module 236 may organize the ports of the network device 200 into port groups based on any of a number of different types of characteristics, including hardware characteristics and software characteristics. Example characteristics may include common system resources, neighboring network device identifiers (IDs), line card associations, port-channel associations, hello intervals, port types, etc. The port groups may be organized into a hierarchy having any number of different levels.

Figure 3:
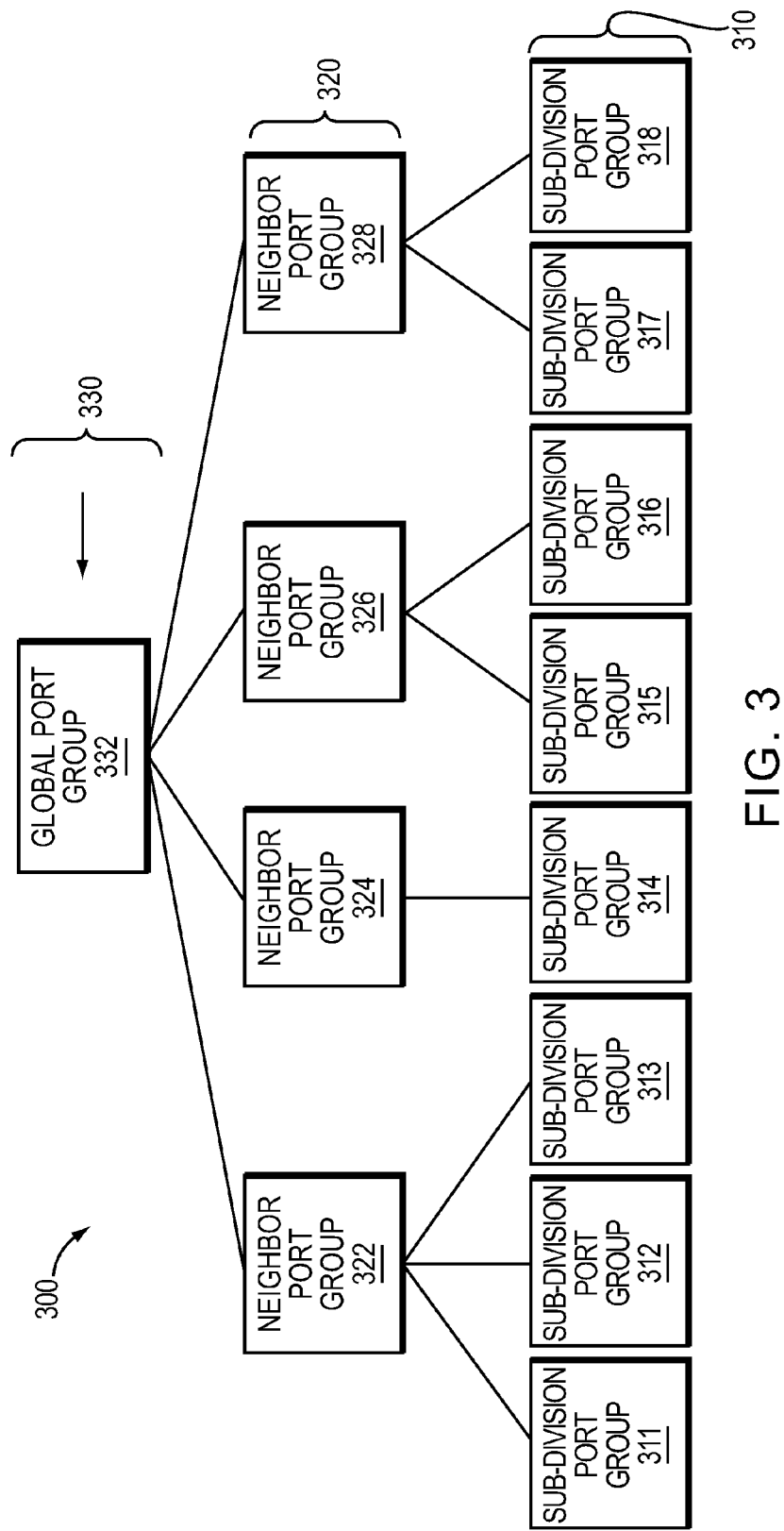
FIG. 3 is a block diagram of an example three-level hierarchy of port groups that includes a first level (e.g., a sub-division level), a next-higher level (e.g., a neighbor port group level), and a highest level (e.g., a global port group level)

FIG. 3 is a block diagram of an example three-level hierarchy 300 of port groups that includes a first level (e.g., a sub-division level) 310, a next-higher level (e.g., a neighbor port group level) 320, and a highest level (e.g., a global port group level) 330. At the first level (e.g., the sub-division level) 310, port groups 311, 312, 313, 314, 315, 316, 317, 318, etc. may include ports that share characteristics such as a common line card 210, common port-channel associations (e.g., are associated with the same EtherChannel or IEEE 802.3ad link aggregation), and the like. Ports of a port group at the first level (e.g., sub-division level) typically have the same management properties and the same first level-specific policy (e.g., sub-division level-specific policy) may be applied to them to detect false positives. For example, if a particular line card 210 is experiencing a transient condition, the first level-specific policy may determine coinciding state expirations of multiple ports of the first level port group are false positives.

At the next-higher level (e.g., the neighbor port group level) 320, port groups 322, 324, 326, 328 may include ports that are coupled to a common neighboring network device, and are thereby associated with a same neighboring network device ID. Ports of a port group at the next-higher level (e.g., neighbor port group level) typically would all suffer from delays related to transient conditions in the packet egress path on the neighboring network device, such as during a processor failover at that device, and a same next-higher level-specific policy (e.g., neighbor port group level-specific policy) may be applied to them to detect false positives. For example, if a particular neighboring network device is experiencing a transient condition, a next-higher level-specific policy may determine coinciding state expirations of multiple ports of the next-higher level port group are false positives.

At the highest level (e.g., global port group level) 330, a port group 332 may include all ports of the network device 200. Ports of a port group at the highest level (e.g., global port group level) typically would all suffer from delays related to transient conditions with the system resources, such as the processor(s) 220, memory 230, inband processing path, etc. of the network device 200, and a same highest level-specific policy (e.g., global port group level-specific policy) may be applied to them to detect false positives. For example, if the processor(s) 220 are experiencing high load, a highest level-specific policy may determine coinciding state expirations of multiple ports of a highest level port group are false positives.

Figure 4:
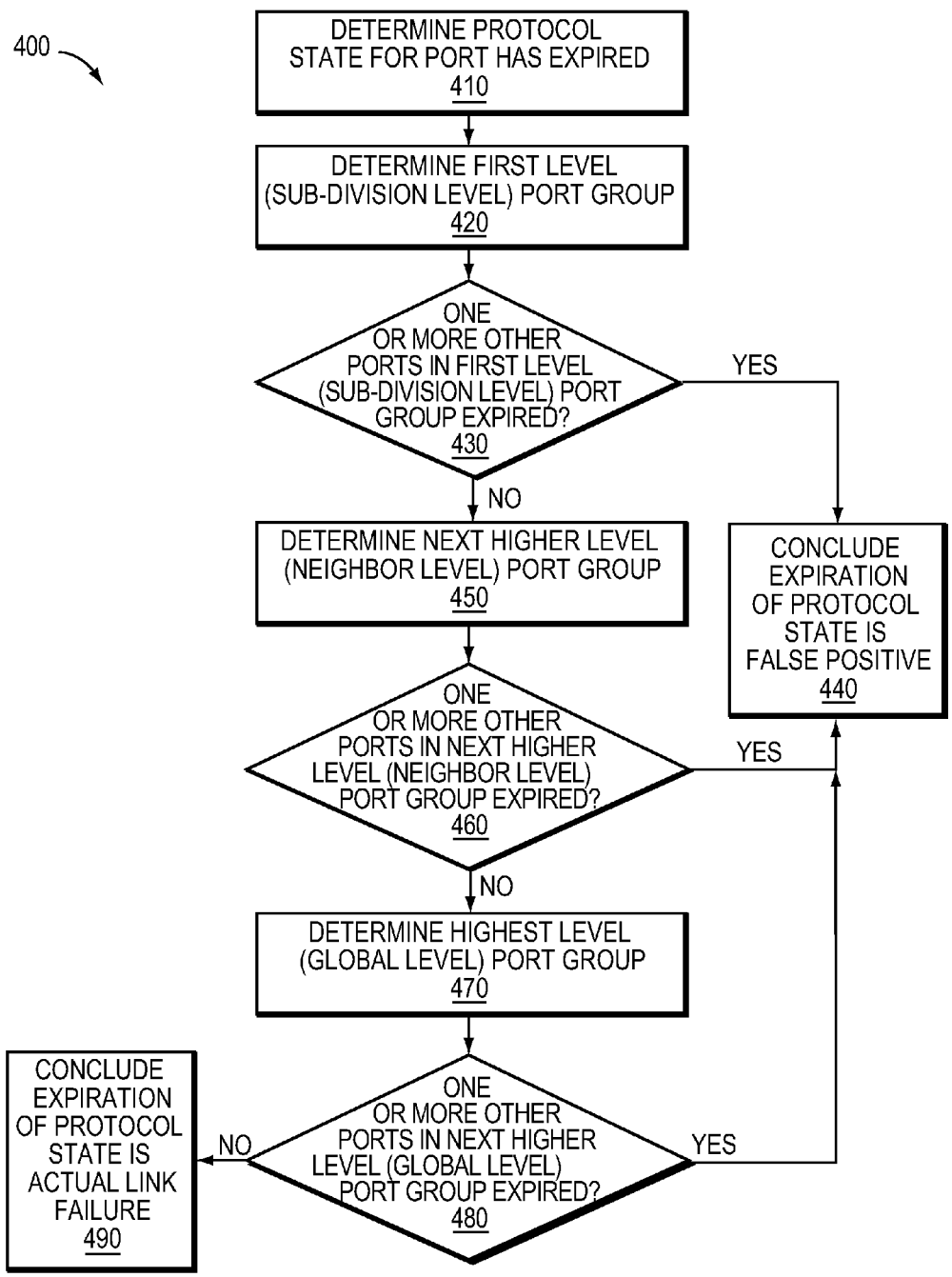
FIG. 4 is a flow diagram of an example sequence of steps for determining if expiration of a protocol state is a false positive.

FIG. 4 is a flow diagram of an example sequence of steps 400 for determining if expiration of a protocol state is a false positive. While the example sequence of steps 400 is based on the example three-level hierarchy 300 of port groups of FIG. 3, it should be understood that the operations may be readily adapted to work with hierarchies of port groups having different numbers of levels, including implementations having only a single level. At step 410, the link monitoring protocol process 234 on the network device 200 determines a protocol state for a port has expired (e.g., no valid protocol packet has been received for a link associated with the port during a protocol timeout period). Execution proceeds to step 420, where the false positive detection module 236 on the network device 200 determines a first level (e.g., a sub-division level) port group on the network device 200 of which the port is a member. At step 430, the false positive detection module 236 applies a policy, such as a first level-specific (e.g., sub-division level-specific) policy, to the first level (e.g., sub-division level) port group, to check whether one or more other ports in the port group also have a corresponding protocol state that has expired. If one or more other ports in the first level (e.g., a sub-division level) port group also have a corresponding protocol state that has expired, execution may proceed to step 440, where the false positive detection module 236 concludes that expiration of the protocol state is a false positive and that further action should not be taken. For example, the false positive detection module 236 may cause the link monitoring protocol process 234 to not transition the port to an undetermined or error disabled state, as it would normally do upon protocol state expiration. Otherwise, if no other ports in the first level (e.g., a sub-division level) port group also has a same protocol state that has expired, execution may proceed step 450.

At step 450, the false positive detection module 236 determines a next-higher level (e.g., a neighbor port group level) port group on the network device 200 of which the port is a member. At step 460, the false positive detection module 236 applies a second policy, such as a next-higher level-specific (e.g., a neighbor port group level-specific) policy, to the next-higher level (e.g., a neighbor port group level) port group, to check whether one or more other ports in the port group also have a corresponding protocol state that has expired. If one or more other ports in the next-higher level (e.g., a neighbor port group level) port group also have a corresponding protocol state that has expired, execution may proceed to step 440, where a false positive is concluded and further action is not taken. Otherwise, if no other ports in the next-higher level (e.g., a neighbor port group level) port group also have a protocol state that has expired, execution may proceed step 470.

At step 470, the false positive detection module 236 determines a highest level (e.g., a global port group level) port group on the network device 200 of which the port is a member. At step 480, the false positive detection module 236 applies a third policy, such as a highest level-specific (e.g., a global port group level-specific) policy, to the highest level (e.g., a global port group level) port group, to check whether one or more other ports in the port group also have a corresponding protocol state that has expired. If one or more other ports in the highest level (e.g., a global port group level) port group also have a same protocol state that has expired, execution may proceed to step 440, where a false positive is concluded. Otherwise, if no other ports in the next-higher level (e.g., a neighbor port group level) port group also have a same protocol state that has expired, execution may proceed to step 490 where the false positive detection module 236 concludes expiration of the protocol state indicates an actual network problem, such as a link failure, and the link monitoring protocol process 234 may take further action, such as signaling the failure by, for example, transitioning the port to an undetermined or error disabled state.

Figure 5:
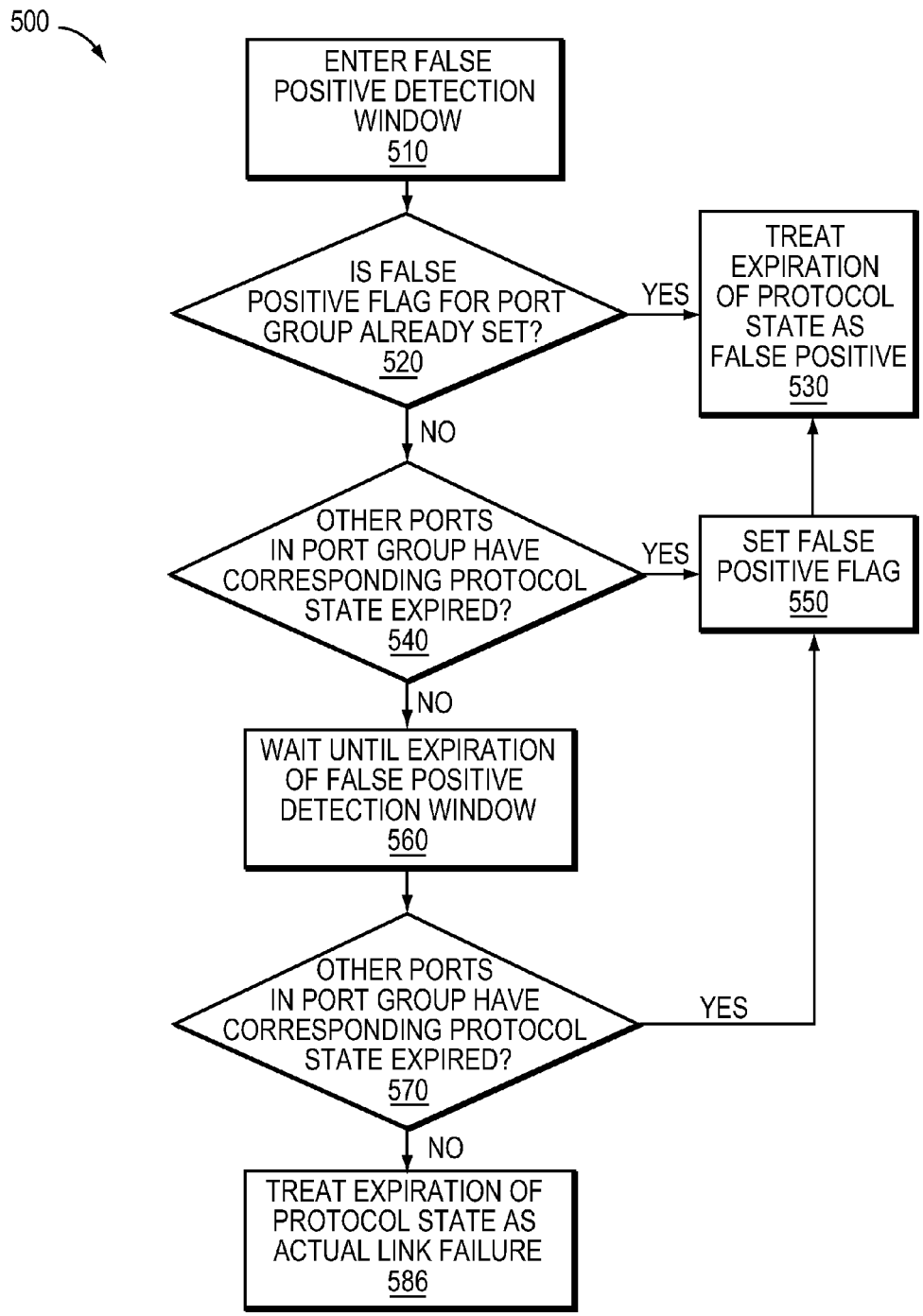
FIG. 5 is a flow diagram of an example sequence of steps for implementing a false positive detection window.

Despite ports of a port group sharing common characteristics, there may be a short time difference between protocol state expiration at one port, and protocol state expiration at another port. Accordingly, a false positive detection window may be utilized to allow enough time for the false positive detection module 236 to gather state information and make an informed decision. FIG. 5 is a flow diagram of an example sequence of steps 500 for implementing a false positive detection window. The example sequence of steps 500 may be implemented each time the false positive detection module 236 checks whether one or more other ports in a port group also have a corresponding protocol state that has expired. At step 510, a false positive detection window having a configured length is entered. At step 520, the false positive detection module 236 checks whether a false positive flag (e.g., a binary flag) for the port group being examined is already set. The state of the false positive flag indicates whether a false positive has recently been detected for the group. If the false positive flag is already set, execution may proceed to step 530, where expiration of the protocol state is treated as a false positive. If the false positive flag is not set, then the port is the first in the port group being examined to experience a protocol state expiration, and execution may proceed to step 540. At step 540, the false positive detection module 236 checks the protocol states of the other ports in the port group, to see is any have a corresponding protocol state that has expired. If so, execution may proceed to step 550, where the false positive flag is set, and then on to step 530, where expiration of the protocol state is treated as a false positive. If not, execution may proceed to step 560, where the false positive detection module 236 waits until expiration of the false positive detection window. Upon expiration of the false positive detection window, at step 570, the false positive detection module 236 again checks the protocol states of the other ports in the port group to see is any have a same protocol state that has expired. If so, execution may proceed to step 550 where the false positive flag is set, and then on to step 530 where expiration of the protocol state is treated as a false positive. If not, execution may proceed to step 580, where expiration of the protocol state is treated as an actual network problem, such as a link failure.

In addition to the above described techniques that look to port groups to determine if expiration of a protocol state of a port is a false positive, additional techniques may be employed to mitigate false positives. According to further embodiments of the present disclosure, protocol states of all, or some, of the ports of a network device may be temporarily "relaxed" (i.e., a timeout value that corresponds to the protocol state may be lengthened, or expiration of the protocol state may be ignored) based on the occurrence of system events on the network device, or some component of the network device, that are known to promote false positives. Certain system events are known to consume significant resources, which may affect the delivery and processing of protocol packets. For example, boot-up of the network device, a change of the operational state of an interface (e.g., due to an interface "shutdown" or "no shutdown" command), a line card online insertion and removal (OIR) operation, and other system events are known to consume significant systems resources. By relaxing protocol states temporarily when such system events are known to be occurring, expiration of protocol states during such "unsteady" periods may be reduced, avoiding some need to discriminate between actual network problems, such as link failures, and false positives.

Figure 6:
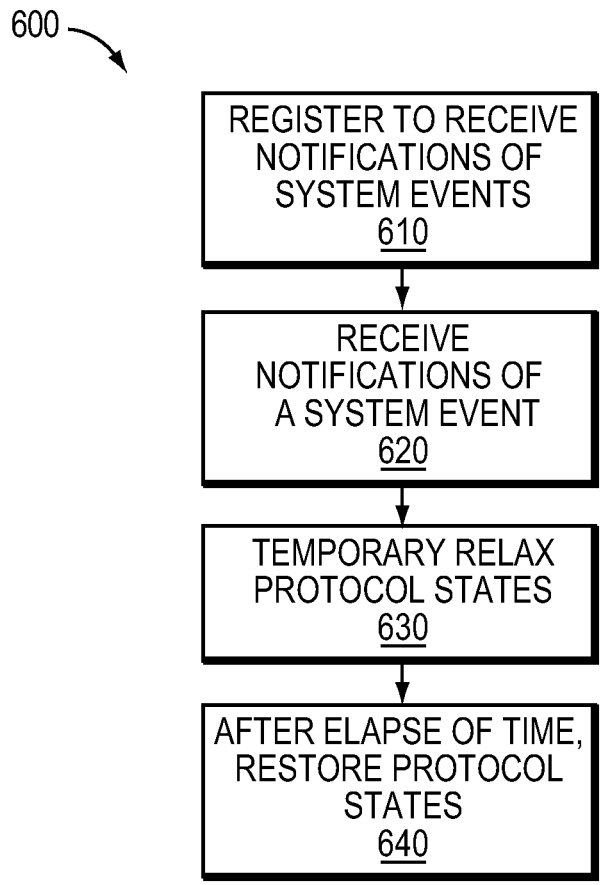
FIG. 6 is an example sequence of steps for relaxing protocol states of one or more ports of a network device based on the occurrence of a system event.

FIG. 6 is an example sequence of steps 600 for relaxing protocol states of one or more ports of a network device 200 based on the occurrence of a system event. At step 610, the link monitoring protocol process 234 registers, for example, with the operating system 232, to receive notifications of one or more types of system events. Such registration may, in some embodiments, only be performed once when the link monitoring protocol process 234 is newly invoked. At step 620, the link monitoring protocol process 234 receives a notification of the occurrence of a system event. In response to the notification, at step 630, the link monitoring protocol process 234 temporarily relaxes protocol states (i.e., lengthens a timeout value that corresponds to the protocol state or ignores expiration of the protocol state) for one or more ports of the network device 200, to temporarily render monitoring to be less sensitive. In a link monitoring protocol that employs multiple failure detection timing modes (e.g., a slow failure detection mode and a fast failure detection mode), such as UDLD protocol, the relaxing may also involve a delay of any transition from a less sensitive failure detection timing mode (e.g., a slow failure detection mode) to a more sensitive failure detection timing mode (e.g., to a fast failure detection mode). At step 640, after a period of time elapses to allow the system event to clear, the protocol states may be restored to their original operation.

In addition to the above described techniques, additional techniques may be employed to mitigate issues that may arise when network devices at opposing ends of a link have differing views regarding a network problem, such as the failure of the link. Since the network device at either end of a link typically independently looks for network problems, such as link failures, one network device may conclude a false positive condition has occurred, while the other network device may suspect an actual network problem. According to one embodiment of the present disclosure, neighboring network devices may coordinate when false positives are detected. Specifically, a network device that detects a false positive at a port associated with a link may signal the neighboring network device at the opposing end of the link that it should increase a timeout value that corresponds to a protocol state of a neighboring port, thus delaying potential expiration of the protocol state at the neighboring network device. In a link monitoring protocol that employs multiple failure detection timing modes (e.g., a slow failure detection mode and a fast failure detection mode), such as UDLD protocol, the signaling may effectively cause the neighboring network device to transition to a slow failure detection mode.

Figure 7:
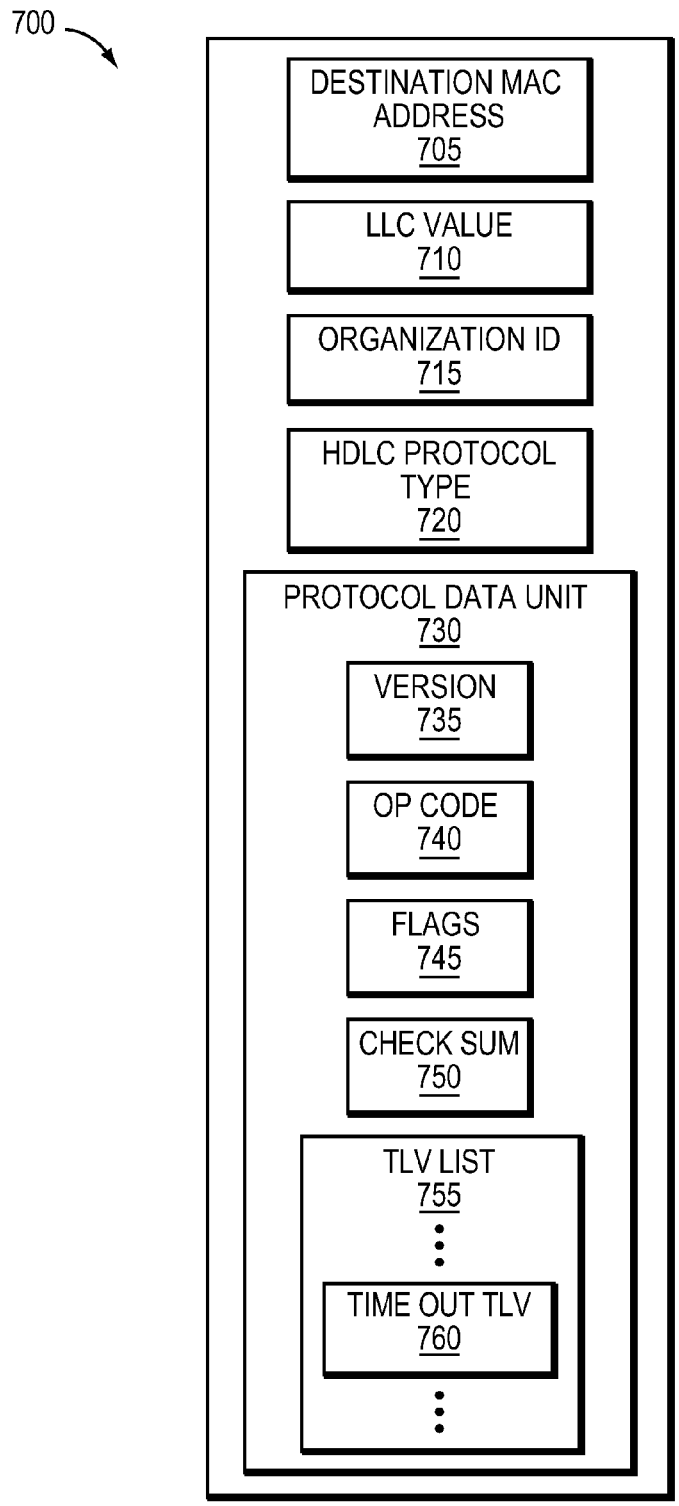
FIG. 7 is an example protocol packet (e.g., keepalive) that includes a high timeout value type-length-value (TLV).

FIG. 7 is an example protocol packet (e.g., keepalive) 700 that includes a high timeout value type-length-value (TLV). The example protocol packet 700 may include a destination media access control (MAC) address field 705, a logical link control (LLC) value field 710, an organization ID field 715, and a high level data link control (HDLC) protocol type field 720. The example protocol packet 700 may further include a protocol data unit (PDU) 730 that has a version field 735, an opcode field 740, a flags field 745, a checksum field 750 and a TLV list 755 that includes a plurality of TLV objects. Each TLV object may indicate a type of data the object contains, a length of the data the object contains, and a value for the data the object contains. In order to permit neighbor coordination of false positives, the TLV list 755 may include a Timeout TLV object 760 that includes a timeout value (e.g., a high timeout value) for a protocol state associated with the port on the neighboring network device. The timeout value (e.g., high timeout value), which upon receipt is used at the receiving port, may delay potential expiration of a protocol state at the receiving port on the neighboring network device, effectively causing the neighboring network device to transition to a slow failure detection mode.

Successive protocol packets 700 may be sent by the network device that detects the false positive to the neighboring network device at the opposing end of the link. The neighboring network device may continue to delay expiration of the protocol state at the receiving port, upon receipt of each protocol packet 700, up to a configurable limit, When the false positive condition clears, the network device that detected the false positive may cease to include the Timeout TLV object 760 in protocol packets 700 sent to the neighboring network device. Upon receipt of one or more protocol packets 700 that lacks a Timeout TLV object 760, the neighboring network device may reset the timeout value for the protocol state associated with the port to its original length.

The above described embodiments may effectively reduce the number and impact of false positives when using a link monitoring protocol in a computer network. It should be understood that various adaptations and modifications may be made within the spirit and scope of the embodiments.

For example, while the false positive detection module 236 is shown to be a sub-portion of the link monitoring protocol process 234, it should be understood that in alternative embodiments the module 236 may be used with other types of protocol processes that do not specifically monitor for link failures. The false positive detection module 236 may be a portion of such other types of protocol processes, or may be entirely separate therefrom. In some embodiments the false positive detection module 236 may be integrated so closely with the respective protocol process such as to not constitute a distinguishable software unit. In other embodiments the false positive detection module 236 may be distributed across multiple network devices, or otherwise arranged.

Further, while the techniques discussed above that look to port groups to determine if expiration of a protocol state of a port is a false positive are discussed in the context of a hierarchy of port groups, it should be understood that such techniques may be used absent any concept of a hierarchy. Depending on the implementation, port of network device 200 may be arranged in any number of port groups that have any of a variety of relationships with one another. Further, certain implementations may only employ a single port group of which some or all of the ports of the network device 200 are members.

Still further, it should be understood that at least some of the above-described embodiments may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc. Accordingly, it should be understood that the above descriptions are meant to be taken only by way of example. It is the object of the appended claims to cover all such variations and modifications as come within the true spirit and scope of the embodiments herein.

What is claimed is:

1. A method comprising:
   determining, by a processor, that a protocol state associated with a first port of a network device has expired, expiration of the protocol state being indicative of a network problem associated with the first port;
   determining, by the processor, that the first port determined to have an expired protocol state is a member of a first port group, the first port group including a plurality of ports of the network device that share one or more common characteristics;
   applying, at the network device, a policy to the plurality of ports of the first port group, to determine whether one or more other ports in the port group also have a corresponding protocol state to the first port that has expired;
   in response to one or more other ports in the first port group also having a corresponding protocol state that has expired, determining that expiration of the protocol state of the first port is a false positive and not taking further action based on expiration of the protocol state;
   when expiration of the protocol state of the first port is not determined to be a false positive, taking further action based on expiration of the protocol state;
   in response to one or more other ports in the first port group not having a corresponding protocol state that has expired, determining a next-higher level port group of which the first port is a member, the next-higher level port group including a second plurality of ports of the network device that share one or more second common characteristics;
   applying a second policy to the second plurality of ports of the next-higher level port group to determine whether one or more other ports in the next-higher level port group also have a corresponding protocol state that has expired; and
   in response to one or more other ports in the next-higher level port group also having a corresponding protocol state that has expired, determining expiration of the protocol state is a false positive, and not taking further action based on expiration of the protocol state.

2. The method of claim 1, wherein the network problem is a link failure of a link associated with the first port and the further action is signaling a link failure of the link associated with the first port.

3. The method of claim 1, wherein expiration of the protocol state occurs when a valid protocol packet has not been received for the link associated with the first port during a protocol timeout period.

4. The method of claim 1, wherein the one or more common characteristics shared by the plurality of ports of the first port group is a common line card.

5. The method of claim 1, wherein the one or more common characteristics shared by the plurality of ports of the first port group is a common port-channel association.

6. The method of claim 1, wherein the one or more second common characteristics shared by the second plurality of ports of the next-higher level port group is being coupled to a common neighboring network device.

7. The method of claim 1, further comprising:
   in response to one or more other ports in the next-higher level port group not having a corresponding protocol state that has expired, determining a highest level port group of which the first port is a member, the highest level port group including a third plurality of ports that share one or more third common characteristics;
   applying a third policy to the third plurality of ports of the highest level port group to determine whether one or more other ports in the highest level port group also have a corresponding protocol state that has expired; and
   in response to one or more other ports in the highest level port group also having a corresponding protocol state that has expired, determining expiration of the protocol state is a false positive, and not taking further action based on expiration of the protocol state.

8. The method of claim 7, wherein the one or more third common characteristics shared by the third plurality of ports of the next-higher level port group is being a port of the network device.

9. The method of claim 1, further comprising:
   receiving a notification of an occurrence of a system event on the network device; and
   in response to the notification of the occurrence of the system event, relaxing the protocol state.

10. The method of claim 9, further comprising:
    registering to receive notifications of the occurrence of system events.

11. The method of claim 1, further comprising:
    in response to determining expiration of the protocol state is a false positive, signaling a neighboring network device at the opposing end of the link associated with the first port.

12. The method of claim 11, wherein the signaling directs the neighboring network device to increase a timeout value that corresponds to a protocol state for a receiving port of the neighboring network device.

13. The method of claim 11, wherein the signaling comprises sending one or more protocol packets that include a timeout value.

14. An apparatus, comprising:
    a plurality of ports organized into a first port group;
    a processor coupled to a network interface and configured to execute software processes and modules; and
    a memory configured to store instructions that, when executed, cause the processor to:
       determine that a protocol state associated with a first port of the first port group has expired, expiration of the protocol state being indicative of a network problem associated with the first port;

apply a policy to the plurality of ports of the first port group to determine whether one or more other ports in the first port group also have a corresponding protocol state to the first port that has expired, in response to one or more other ports in the first port group also having a protocol state that has expired, determine that expiration of the protocol state of the first port is a false positive;

when expiration of the protocol state of the first port is not determined to be a false positive, permit the protocol process to take further action based on expiration of the protocol state;

in response to one or more other ports in the first port group not having a corresponding protocol state that has expired, determine a next-higher level port group of which the first port is a member, the next-higher level port group including a second plurality of ports of the network device that share one or more second common characteristics;

apply a second policy to the second plurality of ports of the next-higher level port group to determine whether one or more other ports in the next-higher level port group also have a corresponding protocol state that has expired; and in response to one or more other ports in the next-higher level port group also having a corresponding protocol state that has expired, determine expiration of the protocol state is a false positive, and not taking further action based on expiration of the protocol state.

15. The apparatus of claim 14, wherein the network problem is link failure of a link coupled to the first port, and the further action is signaling a link failure of the link coupled to the first port.

16. The apparatus of claim 14, wherein the one or more common characteristics shared by the plurality of ports of the first port group is a common line card.

17. The apparatus of claim 14, wherein the one or more common characteristics shared by the plurality of ports of the first port group is a common port-channel association.

18. The apparatus of claim 14, wherein the one or more common characteristics shared by the plurality of ports of the first port group is being coupled to a common neighboring network device.

19. A non-transitory computer-readable medium containing instructions that, when executed by a computing device, cause the computing device to:

determine that a protocol state associated with a first port has expired, expiration of the protocol state being indicative of a network problem associated with the first port;

determine that the first port determined to have an expired protocol state is a member of a first port group, the first port group including a plurality of ports that share one or more common characteristics;

apply a policy to the plurality of ports of the first port group to determine whether one or more other ports in the first port group also have a corresponding protocol state to the first port that has expired;

determine that expiration of the protocol state of the first port is a false positive and not taking further action based on expiration of the protocol state, in response to one or more other ports in the first port group also having a corresponding protocol state that has expired;

take further action based on expiration of the protocol state when expiration of the protocol state of the first port is not determined to be a false positive;

in response to one or more other ports in the first port group not having a corresponding protocol state that has expired, determine a next-higher level port group of which the first port is a member, the next-higher level port group including a second plurality of ports of the network device that share one or more second common characteristics;

apply a second policy to the second plurality of ports of the next-higher level port group to determine whether one or more other ports in the next-higher level port group also have a corresponding protocol state that has expired; and in response to one or more other ports in the next-higher level port group also having a corresponding protocol state that has expired, determine expiration of the protocol state is a false positive, and not taking further action based on expiration of the protocol state.

\* \* \* \* \*